Sept. 21, 1965  A. NEVULIS  3,207,177
VALVE FOR CONTROLLING MOVEMENT OF A FLUID POWER UNIT
Filed Sept. 21, 1962  2 Sheets-Sheet 2

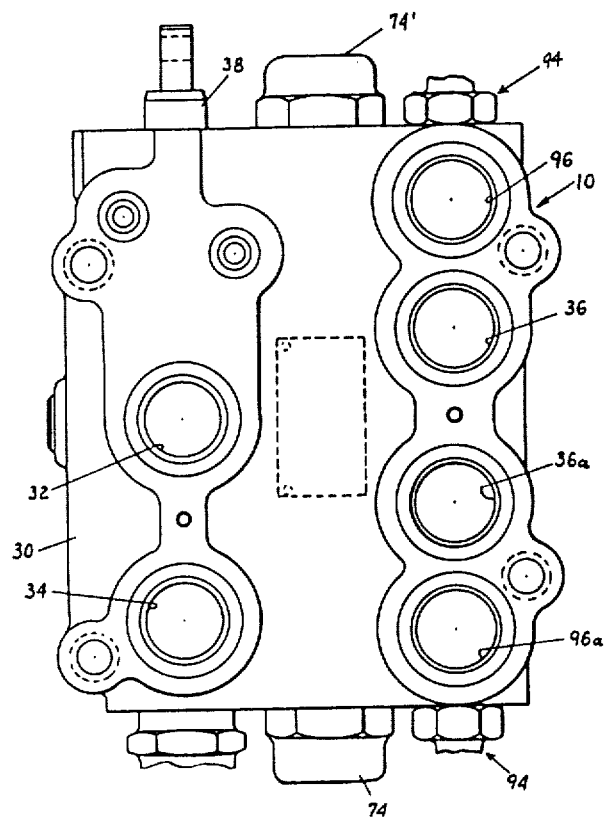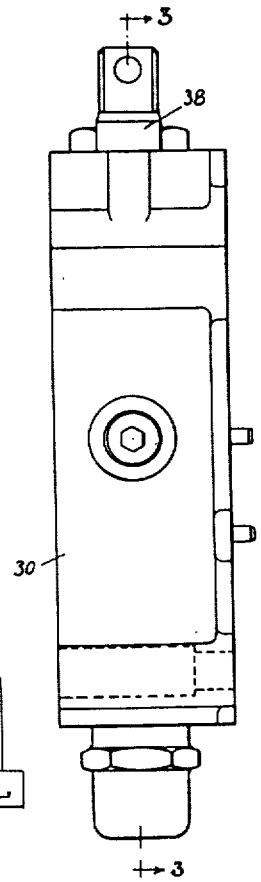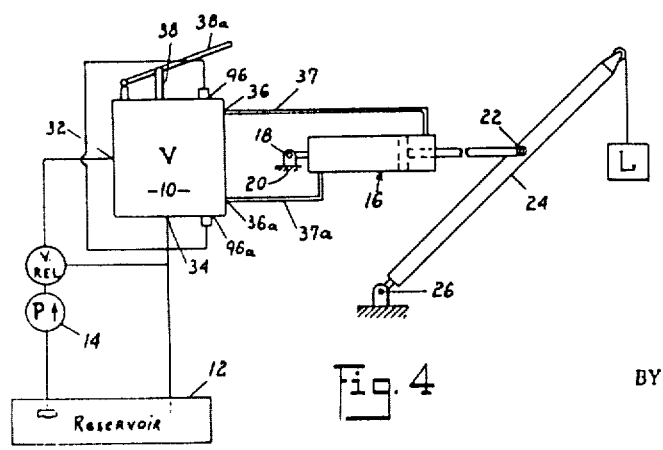

INVENTOR.
ANTHONY NEVULIS
BY
Teare, Fetzer & Teare
ATTORNEYS

Header omitted 3,207,177
VALVE FOR CONTROLLING MOVEMENT OF A
FLUID POWER UNIT
Anthony Nevulis, Wickliffe, Ohio, assignor, by mesne assignments, to The Ohio Brass Company, Mansfield, Ohio, a corporation of New Jersey
Filed Sept. 21, 1962, Ser. No. 225,315
7 Claims. (Cl. 137—596.2)

This invention relates in general to valve mechanism and more particularly to a valve mechanism adapted for use in controlling movement of a fluid powered motor unit.

In fluid pressure control systems, it is conventional to control the application of and the direction of flow of, pressurized fluid, to a fluid powered motor unit, by means of a spool or slide type control valve. A typical example is the use of a slide valve to control the movement of a reciprocal hydraulic ram or motor unit, which ram is used for instance in moving or controlling a pivotal boom or the like. Installations such as these are often found, for instance, on utility type trucks wherein the trucks mount a boom, for handling utility poles, equipment and the like, and wherein the boom is pivotal in a generally vertical plane often times through an angular range of 180° or more, and may also be rotatable about a generally vertical axis.

It is generally desirable in such arrangement to be able to hydraulically lock the piston of the ram or motor unit in selected position in its cylinder, by proper positioning of the spool of the control valve. Accordingly, the control valve may be of a fairly precisely manufactured product, utilizing fairly close tolerances between the valve spool and the valve spool bore in the valve body, in order to prevent as much as possible "drifting" of the motor unit piston, especially under load. Moreover, check valves have sometimes been incorporated in such control valves, to aid in preventing reverse flow of fluid from the motor unit in a predetermined control valve position.

However, since it is impossible to predict when lowering a load what the pressure will be inside the motor unit, since it is generated in part by the load itself, which not only varies from application to application, but may also vary in a particular application at every instant during movement of that motor unit, these prior art arrangements have not been entirely satisfactory, being generally difficult to control, and usually possessing cavitation and chattering problems.

Accordingly, an object of the present invention is to provide a novel control valve for use in optimumly controlling the movement of a fluid powered motor unit.

Another object of the invention is to provide a novel control valve which will be operative to lock, without drift, the fluid acting on a motor unit, after the desired movement of the motor unit has been obtained.

Another object of the invention is to provide a novel control valve for optimumly controlling a fluid powered motor unit and which valve has means therein providing for controlled lowering of the load independent of the size of the load.

A still further object of the invention is to provide a control valve of the latter mentioned type which provides positive anti-cavitation control.

A further object of the invention is to provide a novel control valve including a fluid balanced, exhaust check valve therein in conjunction with a pressure responsive plunger member, for controlling the flow of pressurized fluid from a motor unit, and wherein during lowering of a load by the associated motor unit, the exhaust check valve is generally independent of changes in the pressure force due to the loading, wherein the lowering rate may be determined primarily by the pump output of the system.

Other objects and advantages of the invention will be apparent from the following description taken in conjunction with the accompanying drawings wherein:

FIG. 1 is a side elevational, partially broken view of a spool type control valve embodying the invention;

FIG. 2 is an end elevational view of the valve of FIG. 1, taken from the left hand end thereof;

FIG. 4 is a diagrammatic illustration of a system embodying the control valve of the invention, in connection with a reciprocal motor unit, and load attached thereto.

Figure 3:
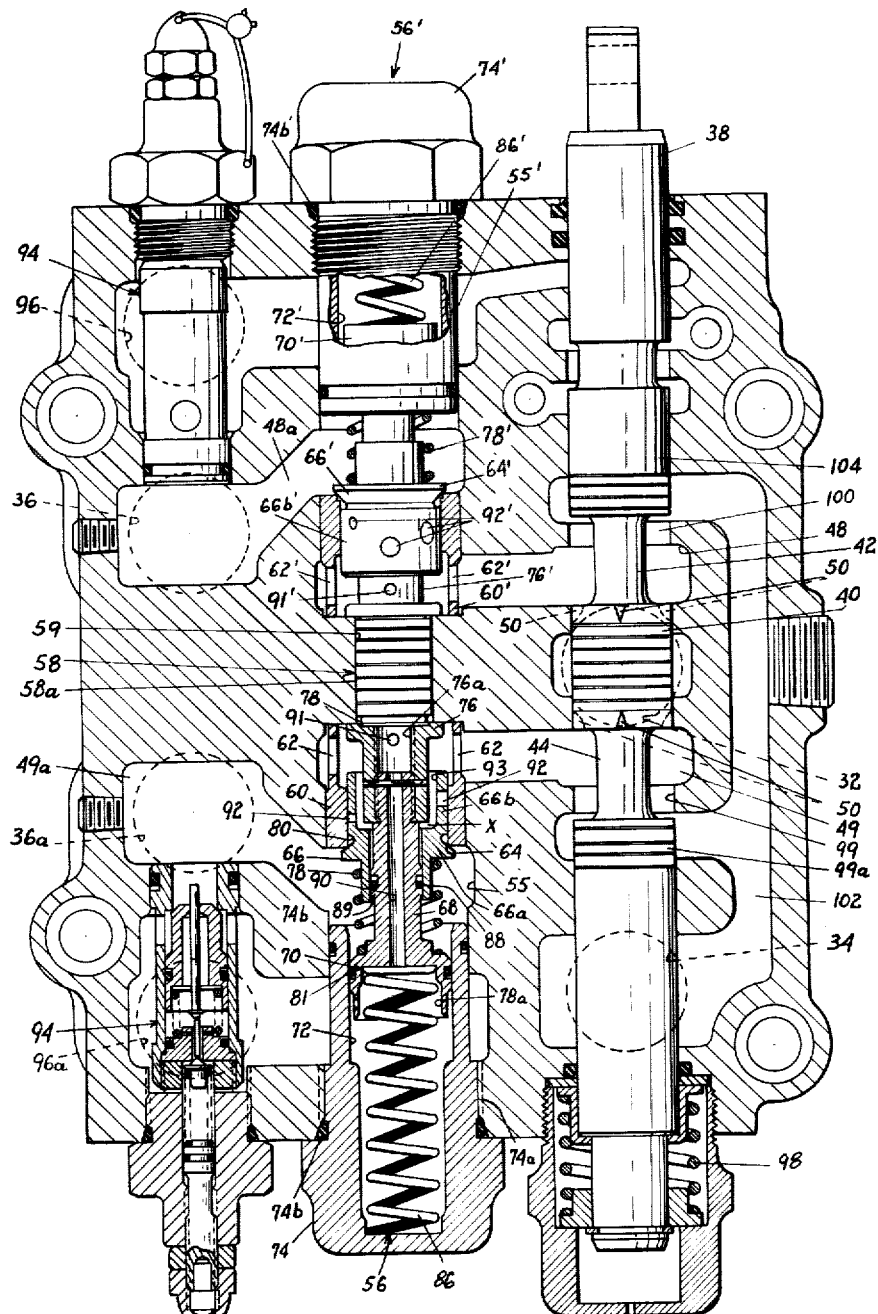
FIG. 3 is a vertical sectional view taken generally along the plane of line 3—3 of FIG. 2, looking in the direction of the arrows.

Referring now again to the drawings, the reference numeral 10 designates a control valve embodying the invention, and as shown in FIG. 4, may be connected into a hydraulic system comprising a reservoir 12, a pump 14 which may be of the constant volume output type, a reciprocal fluid powered motor unit 16, pivotally coupled as at 18 to a support 20, and pivotally connected as at 22, to a load supporting member 24. The load supporting member 24 may be pivoted as at 26 to a support, and as for instance is conventional in the utility truck field, and may be represented in actual practice by, for instance, a boom member for handling telephone poles and other equipment, pivotally supported on the utility truck.

The valve 10, with which this invention is concerned, may comprise a housing or body 30, which may have an inlet port 32, for inflow of pressurized fluid from the pump 14, and an exit port 34, for the exit of fluid from the valve. The valve 10 which may be of the four way, closed center type illustrated, may also have distributing ports 36, 36a, which may be used as inlet and exhaust ports respectively, or vice versa, depending upon the direction of fluid flow through such ports as determined by the position of the valve spool 38. Ports 36, 36a are adapted for coupling to the motor unit 16, and as by means of fluid transmission lines 37, 37a.

Spool 38 may comprise a more or less central land or cylinder portion 40, disposed intermediate grooved portions 42, 44, which land 40 controls communication of the aforementioned inlet port 32 with passageways 48, 48a, and 49, 49a in the valve body. Land 40 may have spaced V-shaped metering slots or grooves 50 therein, as shown, for smoother metering control of the pressurized fluid at port 32.

Positioned in transversely extending chamber or bore 55 or 55' in the valve housing 30 and communicating with a respective one of the motor unit fluid transmitting passageways 48, 48a or 49, 49a is a respective power check valve device 56, 56' with such power check devices coacting with or communicating with one another by means of reciprocal force transfer piston or plunger 58 mounted for slidable or axially movable movement in bore 59, communicating with the aforementioned valve passageways 55, 55'. Plunger 58 may have circumferentially extending grooves 58a formed therein for aiding in resisting leakage of fluid between bores 55, 55'.

Since the power checking devices 56, 56' are identical, only one will be described in detail, with the parts of the other being designated by like numbers but having the prefix prime added thereto. Power checking device 56 may comprise a valve seat 60 pressed into a complementary part of bore 55 formed in the valve housing 30 with such valve seat being provided with openings 62 therein. The valve seat 60 at its outer end provides a valve seating surface or edge 64, which is adapted for engagement with poppet valve member 66 of the checking device. Valve member 66 may comprise a generally frusto-conical head portion 66a and a skirt portion 66b and is slidably mounted in seat 60 and on a stem section 68 of a balancing piston member 70, which is slidably mounted for axial movement in cylindrical portion 72 provided in the inner end of cap member 74. Cap member 74 may be threadedly engaged, as at 74a, with the valve body, and may be provided with sealing means 74b for sealing coaction therewith.

The other end of the stem 68 of balancing piston 70 may be provided with an abutment nut member 76 having an axial passageway 76a extending completely therethrough. Said nut member 76 may be secured as by means of threads with the balancing piston 70 and at its forward end may include a recessed section 78 for receiving therein in confronting abutting relation a complementary formed portion of the aforementioned transfer plunger 58.

Spring 78 extends under predetermined compression between valve member 66 and the balancing piston 70 and is adapted for further compression upon movement of the poppet valve 66 toward piston 70. The valve member 66 may be undercut or circumferentially grooved as at 80.

A spring member 86 coacts between the cap 74 and the recessed seat 78a of the balancing piston member 70 and urges the balancing piston member forwardly to cause abutting coaction between the nut 76 and the confronting surface of the valve around the chamber or bore 59 in which is disposed the balancing plunger member 58. Sealing member 81 may be provided between the piston 70 and the confronting surface of bore 72, and sealing means or O-ring 88 may be provided between the generally cylindrical stem portion 68 and the axial opening or passageway through the valve member 66, for sealing coaction therebetween. Stem 68 has a circumferential raised portion 89 at which is disposed sealing means 88, for reducing friction and aiding in the slidability of check valve 66 with respect to the stem.

As can be best seen in FIG. 3 the balancing piston member 70 has a passageway 90 extending completely therethrough and communicating at one end with the chamber 72 in the cap 74 and at the other end with the passageway 76a in the nut 76. The nut 76 is provided with an orifice 91 therethrough, communicating the passageway 49 in the valve via the passageway 76a in the nut and the passageway 90 in the balancing piston member, with the chamber 72 in cap 74. The area differential between the sealing diameter at seal 81 and the stem seal 88 is approximately the same as the area differential between the seat surface 64 and stem seal 88, therefore providing for a power check valve assembly that is generally pressure balanced so far as the load pressure is concerned, and the sealing at the engagement between poppet valve member 66 and seat 60 is performed primarily by the force of spring 86. This provides for more effective sealing off of the load, giving anti-drift characteristics, than normally provided by control of clearances between the valve spool and housing, as well as reducing the requirement for extremely close tolerances between the spool and housing, resulting in a more economically desirable product. However, spring 78 coacting between balancing piston 70 and the axially movable poppet 66, also urges the latter into sealing relation with valve seat 64 in the neutral position of parts, as illustrated in FIG. 3.

The skirt portion 66b of the valve member 66 is provided with a plurality of axially and circumferentially spaced orifices 92 therethrough, communicating with the interior chamber 93 formed by the skirt portion, for providing for the passage af pressurized fluid therethrough in a manner to be hereinafter described. As can be best seen in FIG. 3, in the normal position of the balancing piston member 70 with the nut 76 engaging the confronting surface of the valve body, and with the spring 86 urging the valve member 66 into engagement with the valve seat member 60, there may be a slight clearance X between the nut member 76 and the valve member 66, the latter being axially movable on the balancing piston member 70.

Conventional, adjustable cartridge-type, pressure relief valve means 94 may also be provided in association with each of passages 48a, 49a in the valve housing 30, to insure that the pressure in the housing does not exceed a predetermined vaue, and such pressure relief devices permit communication of the fluid pressure in passageway 48, 48a and 49, 49a with the respective outlet port 96, 96a (FIG. 1) of the valve housing, the latter ports being connected to the reservoir. The valve spool 38 may be mounted on a spring member 98 and resiliently maintained in its central position in the conventional manner by such spring member.

Operation of the valve may be as follows: When the operator raises the valve spool 38 by means of handle 38a so as to communicate passageway 49 with the pressurized fluid at entry port 32 and close exhaust passage 99 via land 99a, the pressurized fluid enters such passageway 49 and moves through openings 62 in the valve seat member and into engagement with the valve member 66. Once the generally slight pre-load in spring 78 is overcome by the pressure in passageway 49, the valve member 66 is moved away from its seating engagement with the seat member 60, thus permitting the pressurized fluid to flow into portion 49a of the passageway and thence into the motor port or distributing port 36a, thereby causing pressurized fluid to flow via transfer line 37a to one end of the double acting motor unit 16, driving the piston of the motor unit toward the right as viewed in FIG. 4. It will be seen that the greater the outward movement of the head portion 66a away from its seating engagement with surface 64 on the seat 60, the greater exposure of openings 92 in skirt portion 66b of the valve member to passageway 49a, and thus the greater flow of pressurized fluid through valve assembly 56.

Pressurized fluid in passageway 49 also passes through the orifice 91 in the nut member 76 and engages the force transfer piston 58 thus causing movement of the balancing piston 70' of power check unit 56' upwardly, as viewed in FIG. 3, and the nut 76' engages the valve member 66', and moves the valve member 66' away from its seating relationship with its seat member 60', thus permitting the fluid ahead of the piston of motor unit 16 to flow via port 36 through passages 48a, 48, through exhaust passage 100, 102 (FIG. 3) in the valve member as controlled by land 104, and then through exhaust port 34 to the reservoir. It will be seen that with such an arrangment, the balancing piston 70' and check valve 66' acting as a unit, can be moved just by overcoming the pre-load in the spring member 86'. Since the chamber 72' in which the piston member 70' moves, is connected via the passageway 90' and orifice 91' with passageway 48, power check valve 66' is maintained in straight hydraulic balance, and can be moved by the force transfer plunger 58 once the pre-load in the spring 86' is overcome. Thus the power check 56' and its resistance to motion to permit exhaust of fluid from motor unit 16 is independent of the pressure at or in the port 36, and a rise in pressure in passage 49 acting on the cross sectional area of force transfer plunger 58 will create a corresponding force transmitted to the nut 76' of unit 56' tending to disengage the check valve 66' from its seating surface 64', thus exposing apertures 92' in skirt portion 66b', and permitting the flow of fluid from port 36 and passage 48a to passage 48, and through exhaust 34 to the reservoir.

It will be seen that once the boom 24 or load L moves outwardly beyond dead center, the load itself causes a force to be exerted in the exhaust port 36 and thus in the exhausting passageways 48a, 48, since the load generates a pressure itself. As the pressure increases in passage 48 due to the force of the load itself, this rise in pressure will act through aperture 91' against the force transfer plunger 58, to oppose and partially cancel the pressure force developed in passage 49 on the opposite end of the plunger 58, and thus resulting in spring 86' tending to reseat the power check, and closing off the exposure of some of apertures 92'. The reduction in the exhaust area of apertures 92' will reduce the flow from port 36, thereby reducing the pressure in passage 48, and thus reducing the pressure therein opposing the movement of the plunger 58 due to the pressure in passage 49. It will be seen, therefore, that the velocity of the load being lowered will remain substantially constant for a predetermined position of spool 38, irrespective of the pressure at port 36. Once the full flow of the pump is diverted into for instance passage 49, any further increase in the descending load velocity would automatically lower the pressure in passage 49 since the pump operating at its maximum output would not be capable of supplying this flow to for instance the left hand end of the motor unit cylinder 16. This as aforedescribed, would automatically readjust the check valve-balancing piston combination device 56', thereby tending to maintain the velocity of the load descent proportional to the maximum flow of the pump. This therefore provides for positive anti-cavitation protection by limiting the maximum speed of movement of the load to the output of the lamp. Accordingly, by regulating the output of the pump with the spool 38 in one of its extereme or maximum up or down positions, the maximum speed of the descending load can be correspondingly regulated.

While the valve has been illustrated with the control spool 38 and power checks 56, 56' being disposed integrally in the same valve body, it will be understood that members 38 and 56, 56' could be disposed in separate valve bodies connected for instance with fluid transmitting lines. It will also be understood that while the device has been illustrated and described in connection with a double acting motor unit, it could also be expeditiously utilized with single acting motor units, or with double acting units where the load is in one direction only.

From the foregoing discussion and accompanying drawings it will be seen that the invention provides a novel control valve for smoothly controlling the movement of a fluid powered motor unit, and one that is generally independent of the changes in force due to the loading on the motor unit.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A valve for use in a fluid system for controlling the actuation of a fluid powered motor unit, comprising, a housing having a bore therein, motor ports communicating with said bore, inlet and exhaust ports communicating with said bore, spaced valve assemblies in said bore and adapted to control fluid pressure between said motor ports and said inlet and exhaust ports, a force transfer plunger disposed in said bore in coacting relation between said valve assemblies and being responsive to inlet pressure, for operating one of said valve assemblies to control fluid flow to said exhaust port from one of said motor ports, at least said one valve assembly comprising a cylinder, a balancing piston including an outwardly extending stem disposed for axial movement in said cylinder, a poppet valve member mounted on said stem for axial movement relative to said piston member, the confronting surfaces of said piston member and valve member being adapted for exposure to the fluid pressure at said one motor port, a seat in said bore adapted to provide seating means for said valve member, means urging said valve member away from said piston member into seating engagement with said seat, means on said piston member adapted for engagement with said valve member to limit movement of the latter away from said piston member, means urging said piston toward said force transfer plunger, abutment means for limiting the travel of said piston member toward said plunger, and means communicating the interior of said cylinder with said exhaust port, the effective pressure area of said valve member exposed to the fluid pressure at said one motor port being substantially the same as the effective pressure area of said piston member exposed to fluid pressure at said one motor port.

2. A valve in accordance with claim 1 wherein said abutment means comprises a nut secured to the free end of said stem, said nut having apertures therein intersecting said communicating means, said nut being normally disposed in axially aligned, juxtaposed relation with the plunger, in the closed position of said one valve assembly, said means respectively urging said valve member into engagement with said seat and said piston member toward said plunger comprising coil compression springs.

3. A valve in accordance with claim 1 wherein said valve member comprises a frusto conical head portion and a skirt portion extending axially from one side of said head portion, said skirt portion being slidably received in telescopic relation in said seat member and having a plurality of apertures therethrough, said apertures controlling the amount of fluid passing from said one motor port to said exhaust port depending upon the axial position of said valve member with respect to said piston member, and means for limiting movement of said valve member in a direction toward said piston member.

4. A valve in accordance with claim 1 wherein said stem comprises a raised section thereon which slidably mounts said valve member and sealing means at such raised section disposed between said valve member and said stem, for sealing relationship therebetween.

5. A valve for use in a fluid system for controlling the actuation of a fluid powered motor unit, said valve comprising a housing having a passageway therein, a pair of ports in said housing communicating with said passageway, a valve assembly including a valve seat in said passageway adapted to control fluid pressure between said ports, fluid pressure responsive means in said housing adapted for coaction with said valve assembly for operating said valve assembly to control fluid flow from one of said ports to the other of said ports, said valve assembly including means making said valve assembly generally independent of the fluid pressure at said one port, said valve assembly comprising a cylinder, a piston in said cylinder adapted for reciprocal movement therein, a stem extending outwardly from said piston and through said valve seat, a poppet-like valve mounted for lengthwise movement on said stem and adapted for seating engagement with said seat, said poppet-like valve being disposed in lengthwise spaced relation to said piston with the confronting surfaces of said piston and said poppet-like valve being adapted to be subjected to the fluid pressure at said one port, means on said poppet-like valve and on said stem adapted for coaction to limit the movement of said poppet-like valve away from said piston, means urging said piston and associated poppet-like valve toward said pressure responsive means, and urging said poppet-like valve toward seating engagement with said seat, means limiting the travel of said piston toward said pressure responsive means, and means communicating the interior of said cylinder with said other port.

6. A valve in accordance with claim 5 wherein said poppet-like valve comprises a head portion having a frusto-conical exterior configuration adapted for engagement with said valve seat and a skirt portion projecting from said head portion in the direction of said pressure responsive means, said skirt portion having axially and circumferentially apertures therethrough adapted to pass fluid upon predetermined movement of said poppet-like valve away from said seat, said means making said valve assembly independent of fluid pressure at said one port including substantially equal effective pressure areas on said piston and on said poppet-like valve.

7. A valve for use in a fluid system for controlling the actuation of a fluid powered motor unit comprising, a housing having a passageway therein, a pair of ports in said housing communicating with said passageway, a valve assembly in said passageway adapted to control fluid pressure between said ports, said valve assembly comprising a balancing piston disposed in a cylinder, a poppet-like valve member relatively moveable with respect to the piston and adapted for seating engagement with a valve seat, for selectively preventing communication between said ports, resilient means urging said piston and said poppet-like valve member in a direction toward valve seat, means in said valve assembly for limiting movement of said poppet-like valve member away from said piston, fluid pressure actuated means in said housing adapted for coaction with said valve assembly for operating said valve assembly by moving said piston and poppet-like valve member as a unit in a direction away from said valve seat, to control fluid flow from one of said ports to the other of said ports, said valve assembly including means making said valve assembly generally independent of the fluid pressure at said one port, and means communicating said cylinder with said other port.

References Cited by the Examiner

UNITED STATES PATENTS

| | | | |
|---|---|---|---|
| 2,483,312 | 9/49 | Clay | 91—420 XR |
| 2,703,217 | 3/55 | Ashton et al. | 251—282 |
| 2,778,378 | 1/57 | Presnell | 91—420 XR |
| 2,926,634 | 3/60 | Falendysz et al. | 91—420 XR |
| 2,964,016 | 12/60 | Talak | 91—420 |
| 3,129,720 | 4/64 | Allen et al. | 91—420 XR |

M. CARY NELSON, *Primary Examiner.*

LAVERNE D. GEIGER, *Examiner.*